(No Model.)

H. KEHL.
OAT DRILL.

No. 291,356. Patented Jan. 1, 1884.

Witnesses.
P. B. Turpin.
R. W. Bishop.

Inventor
Henry Kehl
By R. S. & A. P. Lacey
Attys

UNITED STATES PATENT OFFICE.

HENRY KEHL, OF MASON CITY, ILLINOIS.

OAT-DRILL.

SPECIFICATION forming part of Letters Patent No. 291,356, dated January 1, 1884.

Application filed August 4, 1883. (No model.)

*To all whom it may concern:*

Be it known that I, HENRY KEHL, a citizen of the United States, residing at Mason City, in the county of Mason and State of Illinois, have invented certain new and useful Improvements in Oat-Drills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seeding-machines, and has for its object to provide a machine for broadcast sowing intended especially for oats, but applicable, it will be readily understood, to all small grains; and it consists in the construction, combination, and arrangement of the several parts, as will be hereinafter more fully described and claimed.

Figure 1:
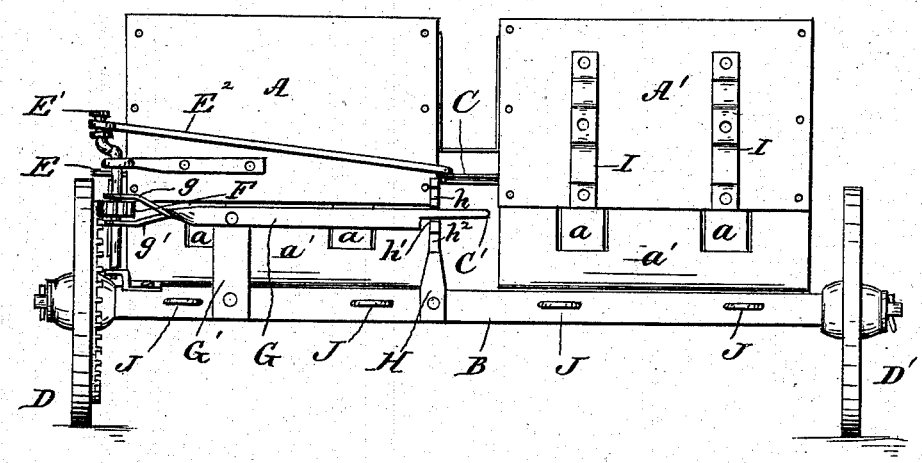
Figure 2:
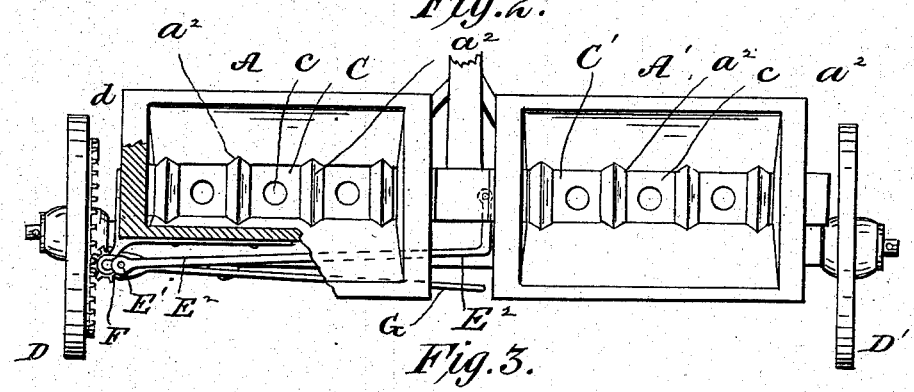
Figure 3:
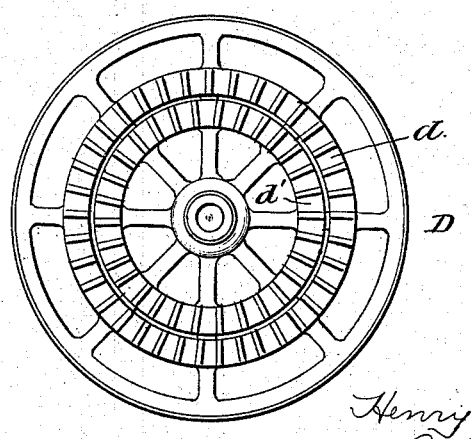

In the drawings, Figure 1 is a rear elevation. Fig. 2 is a plan view of my machine, and Fig. 3 is a detail view of the drive-wheel.

The boxes A A' are supported on the axle B by means of the standards $a$, which hold the boxes slightly above the axle, as shown. Spreader-plates $a'$ $a'$ are secured at their forward edge to the forward edge of the under side of the grain-boxes, and are inclined back and down to about the rear edge of the axle, so as to receive the grain as it passes from the openings in the grain-boxes, and spreads it as is desirable in broadcast-seeders. In these grain-boxes I form suitable grain-openings, leading onto the spreader-plates $a'$, and above these openings I secure the blocks $a^2$, which serve as guides to retain the dropping-slides down on the bottom of the grain-box, and also as a cover for the grain-openings in the dropping-slide when the latter is moved to register with the openings in the grain-box. The grain-boxes, it will be seen, are arranged with a space between them, in which the adjacent ends of the two dropping-slides are lapped, as shown in Fig. 1, and wherein they are connected with the operating mechanism, hereinafter described.

The dropping-slide may be a single flat bar extended through the two boxes; but I prefer to make it in two sections, one, C, of which works in the box A, and the other, C', works in box A'. I prefer to make this slide in sections, as described, because in some instances it is desired to at the same time sow two varieties of seed in different proportions. In such case I employ the two slides C C', one of which has larger openings, $c$, than the other, so that it will sow a larger quantity of seed at each stroke than the other slide, and the former slide I place in the box, in which is placed the seed of which it is desired to sow the largest quantity proportionately. This is useful in the broadcast sowing of grass seed where different varieties are sown in different proportions, and in other cases, the enumeration of which seems unnecessary.

The wheels D D' are spindled on the ends of the axle B. The wheel D has on its inner face, next the box A, the two gear-wheels or rings $d$ $d'$—one larger than the other—as shown. A vertical shaft, E, is suitably journaled between the box A and wheel D, and is bent at its upper end to form the crank E'. This shaft E also has the feather $e$, formed longitudinally on it, for the purpose of securing thereon the pinion F, so the said pinion may be moved longitudinally independent of the shaft E, but can only rotate with the said shaft, as shown. This pinion F is provided with a suitable opening to fit the shaft E, and is placed on the said shaft so that it can be moved into or out of mesh with the gears $d$ $d'$. To effect this adjustment, I provide the lever G, which is pivoted on the standard G', mounted on the axle. One end of this lever is bifurcated, providing the arms $g$ $g'$, which embrace the pinion F, resting one above and the other below the same, as shown. The opposite end of this lever is arranged to engage the notches $h$ $h'$ $h^2$ of the rack-bar H, which is mounted on the axle B. It will be seen that as the lever G is moved it moves the pinion F. In Fig. 1 the lever G is engaged in notch $h'$, and the pinion consequently is meshed with gear $d$; but if the lever be moved up into notch $h$ this will throw the pinion into mesh with gear $d'$, while if the lever be moved down into notch $h^2$ the pinion will be thrown above and clear of the gears. When the pinion is meshed with the gears and the machine is revolved, the shaft E is turned rapidly. This motion is communicated to the dropping-slide by pitman E², which has one end journaled on the wrist of crank E', and its other end carried to the space between the grain-boxes and there connected to the slide or slides, preferably, by bending the point or end of said pitman down through holes formed in the said slides. It will be understood that a single wheel of gears on the wheel D would give good results; but I prefer to use two, as shown, or more, where so desired, in order to get the different speeds.

In practice I change the dropping-slides to suit the grain being sown, different slides being desirable for different grains, as is well understood. Loops I I are secured to the rear side of the grain-boxes, to enable the ready connection of cultivators when such connection is desirable, and eyes J J are secured to the rear side of the axle B, to which harrows may be fastened, so that the operations of sowing and cultivating or harrowing may be simultaneously carried on. I have only shown the loops I on the box A', omitting them from box A, as the illustration of them thereon would tend to obscure that of the slide-operating mechanism.

The operation of my machine will be readily understood from the description before given.

It will be seen that the parts are conveniently arranged and connected, and that a certain prompt dropping action is obtained; also, that this dropping action may be regulated or stopped at the will of the operator.

Having thus described my invention, what I claim, and desire to secure by Letters Patent, is—

1. In a seeding-machine, the combination, with the grain-boxes A A', set slightly apart, and the dropping-slides operating therein, and extended within the space between the boxes, of the drive-wheel provided with a rack-gear, the shaft meshed with said gear and provided with a crank and arranged in rear of the grain-boxes, and the pitman having one end connected with the crank and its opposite end bent at right angles and extended into the space between the grain-boxes and connected to the dropping-slides, substantially as set forth.

2. The combination, in a seeding-machine, of the grain-boxes A A', the loops I I, secured thereon, the dropping-slides, the axle B, the drive-wheel having a rack-gear, the shaft E, provided with a crank E', the pitman E², connecting said crank and the dropping-slides, the pinion F, placed on shaft E, the lug G', and rack H, mounted on the axle, and the lever G, pivoted on lug G', and having one end bifurcated and embracing the pinion F, and its other end arranged in position to engage the rack H, substantially as described, and for the purposes specified.

3. The broadcast-seeder, substantially as specified, composed of the axle B, having wheels D D', the grain-boxes A A', mounted thereon and provided with suitable openings and dropping-slide, loops I, secured on the boxes, whereby to couple cultivators, harrow-connecting eyes J, secured on the axle B, a gear formed on the wheel D, vertical shaft E, having crank E', pitman E², connecting crank E' and the dropping-slide, pinion F, keyed on shaft E, rack-bar H, mounted on the axle, and the pivoted lever G, having one end bifurcated and embracing the pinion F, and its opposite end arranged to engage and be held by rack-bar H, all arranged and operating substantially as specified.

In testimony whereof I affix my signature in presence of two witnesses.

HENRY KEHL.

Witnesses:
  O. L. HAUCHIN,
  G. N. KERN.